Feb. 27, 1923.
W. R. CURTIS
LEVER LINK
Filed Feb. 15, 1922
1,446,884
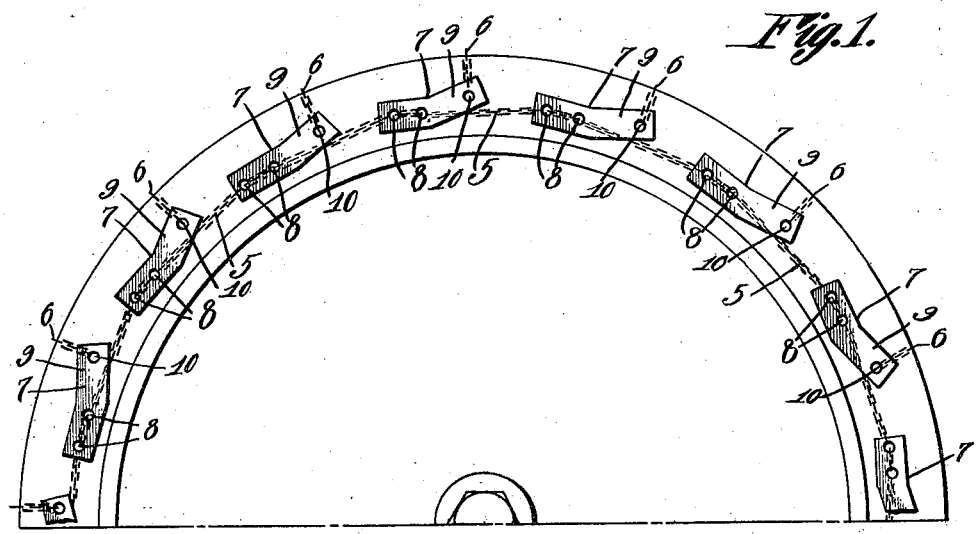
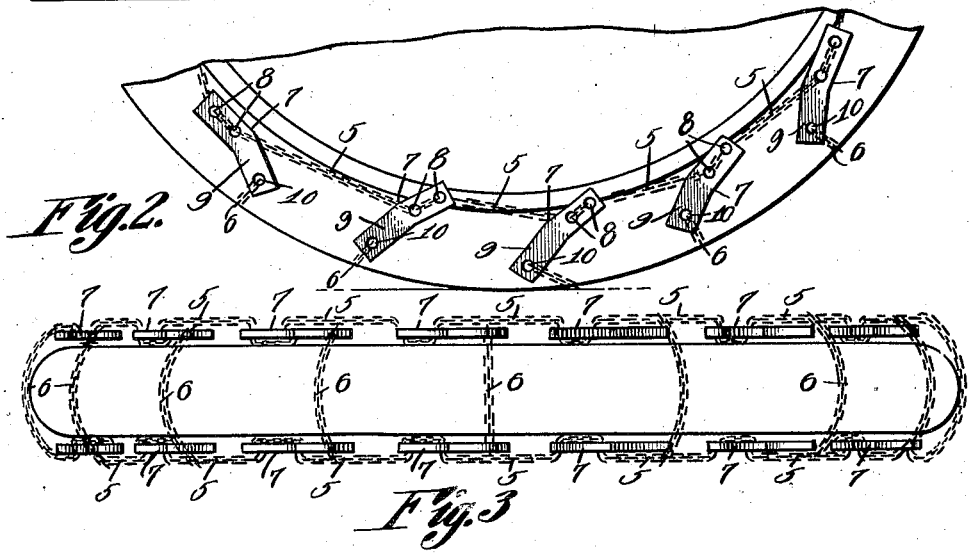
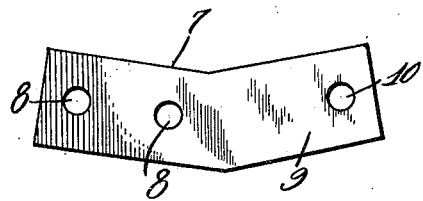
W. R. Curtis
Inventor
By C. A. Snow & Co.
Attorneys Patented Feb. 27, 1923.

1,446,884

UNITED STATES PATENT OFFICE.

WILLIAM ROBERT CURTIS, OF TRACY CITY, TENNESSEE.

LEVER LINK.

Application filed February 15, 1922. Serial No. 536,709.

*To all whom it may concern:*

Be it known that I, WILLIAM R. CURTIS, a citizen of the United States, residing at Tracy City, in the county of Grundy and State of Tennessee, have invented a new and useful Lever Link, of which the following is a specification.

This invention relates to anti-skid chains used in connection with motor vehicle wheels for increasing the traction qualities thereof.

The primary object of the invention is to provide an anti-skid chain wherein the tread chains thereof will be automatically moved into close engagement with the tread of the tire, on which the chain is supported, while the tire is rotating.

Another object of the invention is to provide pivoted arms for connecting the tread chains to the supporting chains, of the device.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a fragmental elevational view of a tire disclosing an anti-skid chain constructed in accordance with the present invention as applied thereto.

Figure 2 is a fragmental elevational view of a tire supplied with an anti-skid chain, showing the movements of the levers which connect the tread chains to the lateral chains of the device.

Figure 3 is a plan view disclosing the relation of the tread chains with the tread of a tire.

Figure 4 is an enlarged detail view of one of the levers.

Referring to the drawing in detail, the device embodies lateral or supporting chains 5, which are, when positioned on a tire, arranged on opposite sides of the tire to support the tread chains indicated at 6.

These tread chains 6 are secured to the supporting chains 5 as by means of the levers 7, which are formed with openings 8 disposed adjacent to one of the ends thereof, the openings being designed to accommodate portions of the supporting chain 5 as clearly shown by Figure 3 of the drawing.

These levers 7 have angular portions 9, each of which is formed with an opening 10 to accommodate the end link of the tread chains 6 associated therewith. The chain may have its ends connected in the usual and well known manner as by means of pivoted link elements, not shown.

From the foregoing and from an observation of Figure 2 of the drawing, it will be seen that when one of the tread chains 6 contacts with the ground surface, the tread chain moves in a direction opposite to the direction of rotation of the tire on which the chain is positioned, to the end that the opposite ends of the levers are rocked, moving the inner ends of the levers towards the hub of the wheel to tighten the tread chains 6 and cause the same to closely engage the tread of the tire.

Having thus described the invention, what is claimed as new is:—

In an anti-skid chain, continuous chain supporting sections, chain supporting levers said levers being bent intermediate their ends, each of said levers having an opening formed adjacent to one end thereof to receive a tread chain of the anti-skid chain, said levers having pairs of openings to receive the continuous chain supporting sections and said continuous chain supporting sections being of lengths to loosely engage a tire and permit movement of any one lever and tread chain with respect to the adjacent levers and chains.

In testimony that I claim the foregoing as my own, I have hereto affixed my signature in the presence of two witnesses.

WILLIAM ROBERT CURTIS.

Witnesses:
E. W. CHEEK.
THOS. J. KING.